Aug. 11, 1931. LA RUE B. CHEVALIER 1,818,304
WRIST PIN
Filed Sept. 26, 1929
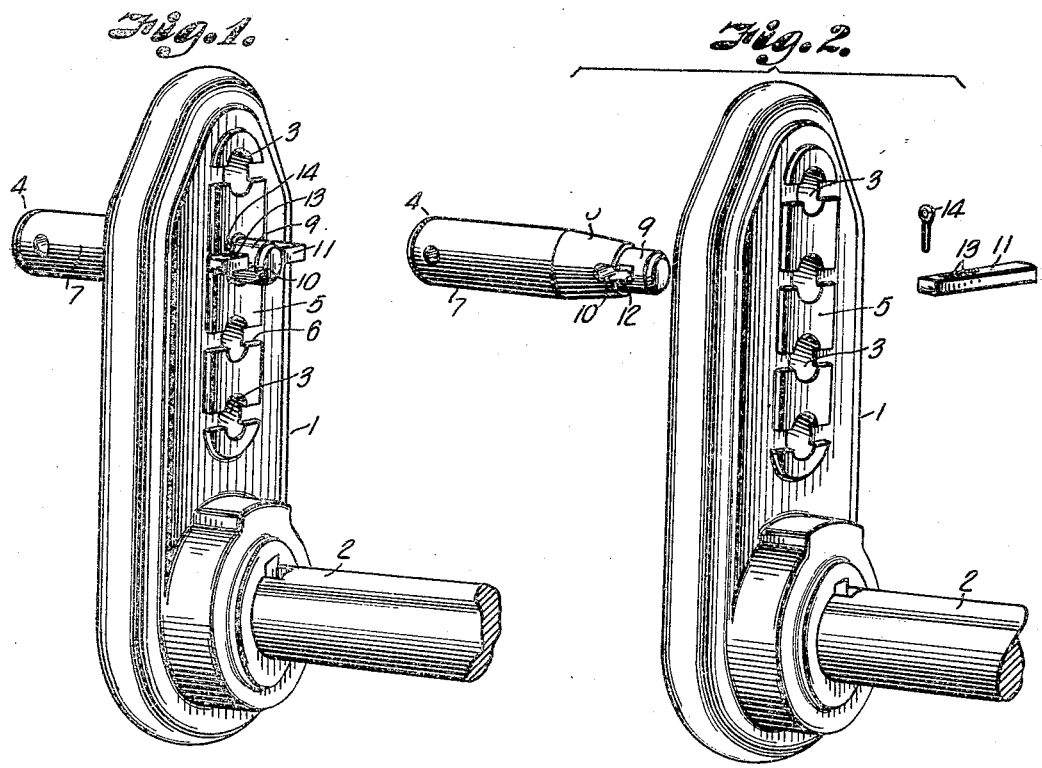
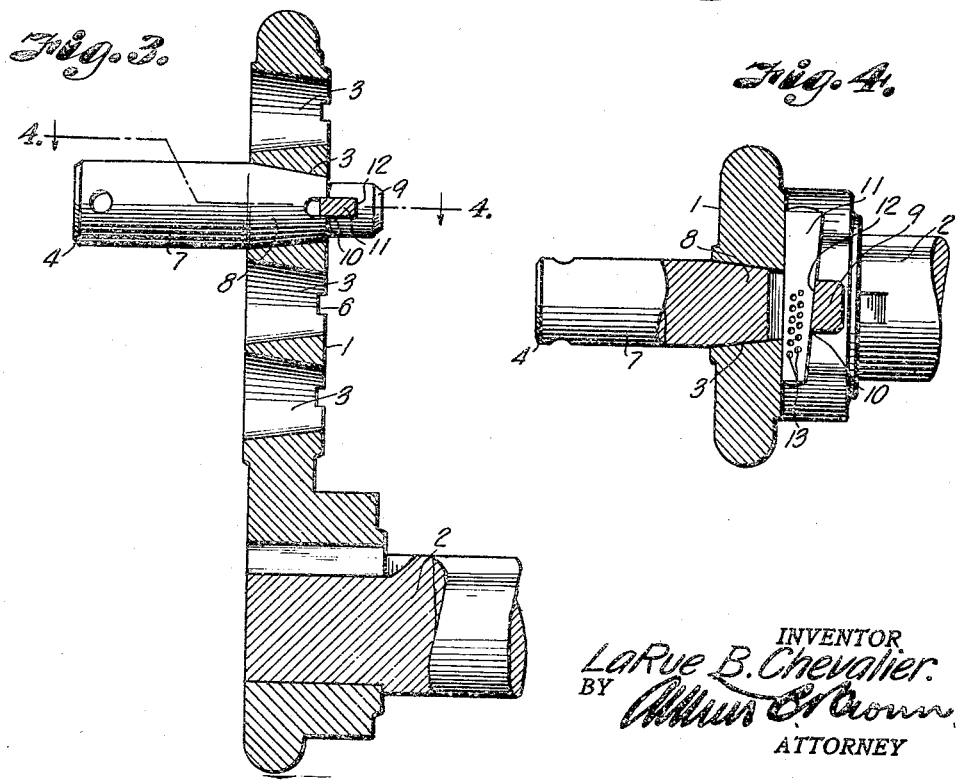
INVENTOR
LaRue B. Chevalier.
BY
ATTORNEY Patented Aug. 11, 1931

1,818,304

UNITED STATES PATENT OFFICE

LA RUE B. CHEVALIER, OF IOLA, KANSAS

WRIST PIN

Application filed September 26, 1929. Serial No. 395,367.

My invention relates to cranks and more particularly to those of that character employed in drilling rigs for transmitting motion from the band wheel shaft to the walking beam pitman, the principal objects of the invention being to facilitate positioning of a wrist pin when changing the effective stroke of the crank, and to securely anchor the wrist pin against rotary movement in the crank.

In ordinary practice, wrist pins are turned from round bars of steel and fit in cylindrical holes in the cranks, the pins having shoulders to engage the machined surfaces of the cranks and are retained by nuts threaded on their projecting ends.

In order to permit assembly of the pin on the crank initial clearance must be provided between the pin and the hole in the crank to insure entrance of the pin and to prevent freezing of the pin in the hole, and the pin is consequently free to turn or change its position in the hole and cause wear of the pin and elongation of the hole in the crank. When a driving fit is made, the pin cannot be removed easily from the hole and both the crank and the pin may be distorted when a pin is driven from the hole.

In accomplishing these and other objects of the invention, I have provided improved details of structure, the preferred forms of which are illustrated in the accompanying drawings, wherein:

Fig. 1 is a perspective view of a crank and wrist pin embodying my invention and part of a band wheel shaft for operating the crank.

Fig. 2 is a perspective view of the crank, wrist pin and pin anchoring member in spaced relation.

Fig. 3 is a central vertical section of the crank and adjacent portion of the shaft and wrist pin mounted therein.

Fig. 4 is a section on the line 4—4, Fig. 3.

Referring in detail to the drawings:

1 designates a crank comprising an elongated block of metal having an opening at one end to receive an operating shaft 2.

In order to vary the effective stroke of the crank, it is provided on its median line with a plurality of aligned openings 3 having tapered walls forming seats for a wrist pin 4. The crank is also provided on its inner face with a flat boss or pad 5 extending along the median line of the crank in alignment with the openings 3 and the boss is provided with grooves 6 extending diametrically across the openings to provide seats for an anchoring key hereinafter described.

The wrist pin 4 has a cylindrical bearing portion 7 having a tapered anchoring portion 8 complementary to the tapered opening 3, and projecting therefrom and past the face of the crank is a cylindrical end 9 of less diameter than the end of the tapered portion 8, and formed therein is a rectangular, slotted opening 10 adapted to align with a groove 6 when the pin is inserted into one of the crank openings, the opening 10 and grooves 6 being of the same width to receive a tapered anchoring key 11, to anchor the pin in the opening.

In order to insure bearing of the key across the entire diameter of the pin the end wall 12 of the slot is complementary to the taper of the key as illustrated in Fig. 4.

The key is provided with a plurality of openings 13 in which a cotter pin 14 may be inserted for retaining the key in the slot of the pin.

In using the invention the wrist pin is inserted in a selected crank opening suited to the length of stroke which it is designed to confer on the pitman. The key is inserted in the pin slot and driven with sufficient force therethrough to draw the pin into snug engagement with the tapered seat of the opening, after which the cotter pin is inserted through the key to retain the key in the pin. The wrist pin is thus anchored against rotation due to its retention in the grooves formed in the crank.

In drilling operations, when it is desirable to change the position of the wrist pin, for example to lengthen the strokes when softer formation is encountered to speed up drilling operations, or to decrease the stroke for hard formations and prevent undue strain and wear on the drilling equipment, the key is removed and the pin is driven out of the tapered opening, after which it may be repositioned in another opening without damaging the pin or crank, or distorting any surfaces in such a manner as to prevent perfect fitting upon repositioning the pin.

Repositioning of a wrist pin is thus facilitated while perfect contact is provided for between the pin and the crank to effect a tight fit and eliminate clearance. All movement of the pin when anchored in a crank opening is thus prevented, whereby possible elongation or distortion of the crank opening is avoided.

Attention is called to the cylindrical tip of the pin having less diameter than the end of the tapered portion, whereby the tapered portion is protected from distortion when the point or end of the pin is hammered to displace the pin from the crank. If the reduced tip is battered and distorted, the snug engagement of the pin in the opening is not interfered with, and a pin may therefore be installed, removed and replaced many times. Damage to the pin due to operation of the locking key in the pin slot is similarly avoided, since any distortion will occur in the reduced tip portion of the pin.

What I claim and desire to secure by Letters Patent is:

In a device of the character described, a crank provided with a series of tapered openings forming pin receiving seats, a boss extending longitudinally of the crank and having cross grooves intersecting said tapered openings, a wrist pin adapted to be selectively received in any one of said seats and having a cylindrical bearing portion and an anchoring portion tapering from the periphery of the bearing portion to be received in the selected seat and having a slot of sufficient depth to extend above and below said grooves, a tapered key received in the slot and adapted to engage the end of the slot projecting above the groove intersecting the selected seat to draw the tapered portion of the pin in wedging contact with the seat and a reduced extension on the pin projecting from the boss to aid in removal of the pin.

In testimony whereof I affix my signature.

LA RUE B. CHEVALIER.